(12) United States Patent
Robles-Kelly et al.

(10) Patent No.: US 8,953,906 B2
(45) Date of Patent: Feb. 10, 2015

(54) ILLUMINATION SPECTRUM RECOVERY

(75) Inventors: Antonio Robles-Kelly, Kaleen (AU); Cong Phuoc Huynh, Braddon (AU)

(73) Assignee: National ICT Australia Limited, Eveleigh, NSW (AU)

( * ) Notice: Subject to any disclaimer, the term of this patent is extended or adjusted under 35 U.S.C. 154(b) by 257 days.

(21) Appl. No.: 13/394,105

(22) PCT Filed: Aug. 9, 2010

(86) PCT No.: PCT/AU2010/001005
§ 371 (c)(1),
(2), (4) Date: Oct. 18, 2012

(87) PCT Pub. No.: WO2011/026168
PCT Pub. Date: Mar. 10, 2011

(65) Prior Publication Data
US 2012/0207404 A1 Aug. 16, 2012

(30) Foreign Application Priority Data

Sep. 3, 2009 (AU) ................................ 2009904219
Apr. 22, 2010 (AU) ................................ 2010901785

(51) Int. Cl.
*G06K 9/36* (2006.01)
*G06K 9/64* (2006.01)
(Continued)

(52) U.S. Cl.
CPC ............ *G06K 9/4661* (2013.01); *G06T 7/0055* (2013.01); *G06T 2207/10024* (2013.01); *G06T 2207/20081* (2013.01); *G06T 2207/30201* (2013.01)

USPC .......................................................... 382/286

(58) Field of Classification Search
None
See application file for complete search history.

(56) References Cited

U.S. PATENT DOCUMENTS

| 2003/0012448 A1* | 1/2003 | Kimmel et al. ............... 382/274 |
| 2009/0213120 A1* | 8/2009 | Nisper et al. ................... 345/426 |

(Continued)

OTHER PUBLICATIONS

Ghosh, A., Hawkins, T., Peers, P., Frederiksen, S., and Debevec, P., Practical Modeling and Acquisition of Layered Facial Reflectance, 2008, ACM Transactions on Graphics, vol. 27, No. 5, pp. 139:1-139:10.*

(Continued)

*Primary Examiner* — Stephen R Koziol
*Assistant Examiner* — Jonathan S Lee

(57) ABSTRACT

The disclosure concerns processing of electronic images, such as hyperspectral, multispectral or trichromatic images. In particular, but is not limited to, a method, software and computer for estimating parameters of a reflectance model applied to an image is disclosed. Examples of processing of the images using the estimated parameters includes material recognition, re-coloring and re-shading of objects represented in the image. That is, a computer implemented method is provided of estimating one or more of photogrammetric parameters, $\Omega^{(u)}$ surface shape $N$ and index of refraction $n(u,\lambda)$ represented in a reflectance image having one or more known illumination directions $L$ and a known viewing direction $V$, the method comprising optimizing (802) the difference between the reflectance image and a reflectance model, the reflectance model being based on surface shape $N$; the material index of refraction $n(u,\lambda)$ and a set of photogrammetric parameters $\Omega^{(u)}$.

19 Claims, 8 Drawing Sheets

(51) Int. Cl.
 G06K 9/46 (2006.01)
 G06T 7/00 (2006.01)

(56) References Cited

U.S. PATENT DOCUMENTS

2009/0226049 A1* 9/2009 Debevec et al. ............. 382/118
2009/0316156 A1* 12/2009 Takagi ........................ 356/445

OTHER PUBLICATIONS

Yu, T., Xu, N., and Ahuja, N., Shape and View Independent Reflectance Map from Multiple Views, International Journal of Computer Vision, vol. 73, No. 2, pp. 123-138.*

J.A. Ogilvy, "Wave Scattering from Rough Surfaces", 1987; pp. 1553-1608.

Robert T. Frankot, "A Method for Enforcing Integrability in Shape from Shading Algorithms", IEEE Transactions on Pattern Analysis and Machine Intelligence, Jul. 1998, vol. 10. No. 4; pp. 439-451.

C. L. Vernold, "A Modified Beckmann-Kirchoff Scattering Theory for Non-Paraxial Angles", In Scattering and Surface Roughness, vol. 34261, Jul. 1998, SPIE Conference; pp. 51-56.

S. N. Kasarova, "Analysis of the Dispersion of Optical Plastic Materials", Optical Materials 29 (2007); pp. 1481-1490.

L. B. Wolff, "Diffuse-Reflectance Model for Smooth Dielectric Surfaces", Journal of the Optical Society of America; Nov. 1994, vol. 11, No. 11; pp. 2956-2968.

P. L. Worthington, "New Constraints on Data-Closeness and Needle Map Consistency for Shape-From-Shading", IEEE Transactions on Pattern Analysis and Machine Intelligence, Dec. 1999, vol. 21, No. 12; pp. 1250-1267.

R. Kimmel, "Tracking Level Sets by Level Sets: A Method for Solving the Shape from Shading Problem", Computer Vision and Image Understanding, vol. 62, No. 2, Jul. 1995; pp. 47-58.

K. E. Torrance, "Theory for Off-Specular Reflection from Roughened Surfaces", Journal of the Optical Society of America; Sep. 1967, vol. 57, No. 9; pp. 1105-1114.

B. Horn, "The Variational Approach to Shape from Shading", Massachusetts Institute of Technology Artificial Intelligence Laboratory, Mar. 1985, 33 pages.

C. P. Huynh, "Simultaneous Photometric Invariance and Shape Recovery", IEEE 12$^{th}$ International Conference on Computer Vision, 2009; 8 pages.

S. K. Nayar, "Shape and Reflectance from Image Intensities", Proceedings of Third Annual Conference on Intelligent Robotic Systems for Space Exploration, 1991; pp. 81-98.

K. N. Kutulakos, "A Theory of Refractive and Specular 3D Shape by Light-Path Triangulation", Tenth IEEE International Conference on Computer Vision, 2005; 33 pages.

D. Miyazaki, "Polarization-Based Inverse Rendering from a Single View", Proceedings of Ninth IEEE International Conference on Computer Vision 2003; pp. 982-987.

P. Beckman, "Random Rough Surfaces: I. Surfaces Generated by Random Processes", Pergamon Press 1963; pp. 70-99.

J. Nocedal, "Line Search Methods", 2006, Numerical Optimization, Springer, New York, Chapter 3; pp. 30-41.

* cited by examiner $$\sum_{l=1}^{M} \int_W \left(R_l(u,\lambda) - f_l(u,\lambda)\right) \frac{\partial f_l(u,\lambda)}{\partial p(u)} d\lambda + \alpha(p_{yy}(u) - q_{xy}(u)) = 0$$

$$\sum_{l=1}^{M} \int_W \left(R_l(u,\lambda) - f_l(u,\lambda)\right) \frac{\partial f_l(u,\lambda)}{\partial q(u)} d\lambda + \alpha(q_{xx}(u) - p_{yx}(u)) = 0$$

$$\sum_{l=1}^{M} \int_\mathcal{I} \left(R_l(u,\lambda) - f_l(u,\lambda)\right) \frac{\partial f_l(u,\lambda)}{\partial n(\lambda)} du + \beta \frac{\partial^2 n(\lambda)}{d\lambda^2} = 0$$

$$\sum_{l=1}^{M} \int_W \left(R_l(u,\lambda) - f_l(u,\lambda)\right) \frac{\partial f_l(u,\lambda)}{\partial \Omega(u)} d\lambda + \gamma \left(\Omega_{xx}(u) + \Omega_{yy}(u)\right) = 0$$

Fig. 2

$$p^{(t+1)}(u) = \overline{p}^{(t)}(u) - \frac{1}{2}\hat{q}^{(t)}(u) + \frac{\epsilon_a^2}{2\alpha} \times \sum_{l=1}^{M} \sum_{k=1}^{K} (R_l(u,\lambda_k) - f_l^{(t)}(u,\lambda_k)) \frac{\partial f_l^{(t)}(u,\lambda_k)}{\partial p^{(t)}(u)}$$

$$q^{(t+1)}(u) = \overline{q}^{(t)}(u) - \frac{1}{2}\hat{p}^{(t)}(u) + \frac{\epsilon_a^2}{2\alpha} \times \sum_{l=1}^{M} \sum_{k=1}^{K} (R_l(u,\lambda_k) - f_l^{(t)}(u,\lambda_k)) \frac{\partial f_l^{(t)}(u,\lambda_k)}{\partial q^{(t)}(u)}$$

$$n^{(t+1)}(\lambda_k) = \overline{n}^{(t)}(\lambda_k) + \frac{\epsilon_w^2}{2\beta} \times \sum_{l=1}^{M} \sum_{u \in \mathcal{I}} (R_l(u,\lambda_k) - f_l^{(t)}(u,\lambda_k)) \frac{\partial f_l^{(t)}(u,\lambda_k)}{\partial n^{(t)}(\lambda_k)}$$

$$\Omega^{(t+1)}(u) = \overline{\Omega}^{(t)}(u) + \frac{\epsilon_a^2}{4\gamma} \times \sum_{l=1}^{M} \sum_{k=1}^{K} (R_l(u,\lambda_k) - f_l^{(t)}(u,\lambda_k)) \frac{\partial f_l^{(t)}(u,\lambda_k)}{\partial \Omega^{(t)}(u)}$$

Fig. 3

$$\begin{aligned}
p^{(t+1)}(u) = &\overline{p}^{(t)}(u) - \tfrac{1}{2}\hat{q}^{(t)}(u) + \tfrac{\epsilon_a^2}{2\alpha} \times \sum_{l=1}^{M}\sum_{k=1}^{K}(\log R_l(u,\lambda_k) - h_l^{(t)}(u,\lambda_k)) \times \\
&\left[\left(\frac{1}{F(\theta_i^{(t)}(u),n^{(t)}(\lambda_k))}\frac{\partial F(\theta_i^{(t)}(u),n^{(t)}(\lambda_k))}{\partial \cos\theta_i^{(t)}(u)} + \frac{1}{\cos\theta_i^{(t)}(u)}\right)\frac{\partial \cos\theta_i^{(t)}(u)}{\partial p^{(t)}(u)} + \left(\frac{m^{(t)}(u)}{2\cos^3\theta_h^{(t)}(u)} - \frac{2}{\cos\theta_h^{(t)}(u)}\right)\frac{\partial \cos\theta_h^{(t)}(u)}{\partial p^{(t)}(u)}\right] \\
q^{(t+1)}(u) = &\overline{q}^{(t)}(u) - \tfrac{1}{2}\hat{p}^{(t)}(u) + \tfrac{\epsilon_a^2}{2\alpha} \times \sum_{l=1}^{M}\sum_{k=1}^{K}(\log R_l(u,\lambda_k) - h_l^{(t)}(u,\lambda_k)) \times \\
&\left[\left(\frac{1}{F(\theta_i^{(t)}(u),n^{(t)}(\lambda_k))}\frac{\partial F(\theta_i^{(t)}(u),n^{(t)}(\lambda_k))}{\partial \cos\theta_i^{(t)}(u)} + \frac{1}{\cos\theta_i^{(t)}(u)}\right)\frac{\partial \cos\theta_i^{(t)}(u)}{\partial q^{(t)}(u)} + \left(\frac{m^{(t)}(u)}{2\cos^3\theta_h^{(t)}(u)} - \frac{2}{\cos\theta_h^{(t)}(u)}\right)\frac{\partial \cos\theta_h^{(t)}(u)}{\partial q^{(t)}(u)}\right] \\
n^{(t+1)}(\lambda_k) = &\overline{n}^{(t)}(\lambda_k) + \tfrac{\epsilon_w^2}{2\beta} \times \sum_{l=1}^{M}\sum_{u \in \mathcal{I}}(\log R_l(u,\lambda_k) - h_l^{(t)}(u,\lambda_k))\frac{1}{F(\theta_i^{(t)}(u),n^{(t)}(\lambda_k))}\frac{\partial F(\theta_i^{(t)}(u),n^{(t)}(\lambda_k))}{\partial n^{(t)}(\lambda_k)} \\
m^{(t+1)}(u) = &\overline{m}^{(t)}(u) + \tfrac{\epsilon_a^2}{4\gamma} \times \sum_{l=1}^{M}\sum_{k=1}^{K}(\log R_l(u,\lambda_k) - h_l^{(t)}(u,\lambda_k))\left(\frac{1}{m^{(t)}(u)} - \tfrac{1}{4}\tan^2\theta_h^{(t)}(u)\right)
\end{aligned}$$

Fig. 4

ILLUMINATION SPECTRUM RECOVERY

CROSS REFERENCE TO RELATED APPLICATIONS

The present application claims priority from Australian provisional patent application No. 2009904219 filed 3 Sep. 2009 the content of which is incorporated herein by reference.

The present application claims priority from Australian provisional patent application No. 2010901785 filed 22 Apr. 2010 the content of which is incorporated herein by reference.

The present application is related to International (PCT) application PCT/AU2009/000793 filed 19 Jun. 2009 and published as WO 2009/152583 the content of which is incorporated herein by reference.

The present application is related to International (PCT) application co-filed with the present application and claiming priority from Australian provisional patent application No. 2009904230 filed 3 Sep. 2009 and from Australian provisional patent application No. 2010900383 filed 1 Feb. 2010 the content of which is incorporated herein by reference.

The present application is related to International (PCT) application co-filed with the present application and claiming priority from Australian provisional patent application No. 2009904218 filed 3 Sep. 2009 the content of which is incorporated herein by reference.

TECHNICAL FIELD

The disclosure concerns processing of electronic images, such as hyperspectral, multispectral or trichromatic images. In particular, but is not limited to, a method, software and computer for estimating parameters of a reflectance model applied to an image are disclosed. Examples of processing of the images using the estimated parameters include material recognition, recolouring and re-shading of objects represented in the image.

BACKGROUND ART

Photometric invariance has found applications in computer vision and pattern recognition for purposes of recognition and shape recovery.

There exist many reflectance models that can be used to describe the range of parameters that can express the reflectance captured in an image.

The intrinsic relation between photometric invariance and shape recovery is due to the fact that the reflectance of an object is estimated not only by the light source $\vec{L}$ and viewing directions $\vec{V}$, but also by the material properties of the surface under study.

The non-collinearity of the viewing $\vec{V}$ and light directions $\vec{L}$ on non-Lambertian (i.e. shinny or non-matt) surfaces using the continuous solutions to the image irradiance equation suggests a generalisation of integral shape-from-shading schemes for purposes of photometric invariance. Along these lines, effort related to photometric invariance with respect to shape recovery is devoted to modelling the effects encountered on shiny or rough surfaces.

Any discussion of documents, acts, materials, devices, articles or the like which has been included in the present specification is solely for the purpose of providing a context for the present disclosure. It is not to be taken as an admission that any or all of these matters form part of the prior art base or were common general knowledge in the field relevant to the present disclosure as it existed before the priority date of each claim of this application.

SUMMARY

In a first aspect, a computer implemented method is provided of estimating one or more of photogrammetric parameters $\Omega(u)$, surface shape $\vec{N}$ and index of refraction $n(u,\lambda)$ represented in a reflectance image having one or more known illumination directions $\vec{L}$ and a single known viewing direction $\vec{V}$, the method comprising:

optimising a difference between the reflectance image and a reflectance model, the reflectance model being based on surface shape $\vec{N}$, the material index of refraction $n(u,\lambda)$ and a set of photogrammetric parameters $\Omega(u)$.

Surface shape, is understood to mean, but is not limited to, the orientation of the surface under study and can be equivalent to the surface normal $\vec{N}$. This surface normal $\vec{N}$ may be expressed using the surface gradients $p(u)$ and $q(u)$.

Photometric invariants is understood here to mean the physical properties of the material under study that is independent of the lighting conditions (including the type of light, the light power spectrum and light direction) and the geometric shape of the object.

One or more images are acquired using different lighting directions $\vec{L}$ with a known illuminant power spectrum. Given these conditions, using the method disclosed here the surface shape $\vec{N}$, material index of refraction $n(u,\lambda)$ and/or its photogrammetric parameters $\Omega(u)$ can be estimated. The recovery process is formulated as an optimisation which aims to fit the reflectance models under study to the image reflectance. The approach presented has the advantages of being general and can be applied to a family of reflectance models that are based on Fresnel reflection theory. That is, the reflectance model and the optimisation procedure have the advantage of being general to a family of reflectance models. Therefore a single procedure can be applied to all of the models uniformly, which may cover future models belonging to this family. The most appropriate reflectance model for the image, which may be selected depending on the processing to be performed on the image may be used in this method. Also the method may be used on any combination of known and unknown parameters of the reflectance model.

Photogrammetric parameters $\Omega(u)$ may be parameters of the reflectance model and may be one or more of:
microscopic roughness factor,
local microfacet slope,
masking factor,
reflectance factor, or
shadowing factor.

The method may comprise identifying one or more of photogrammetric parameters $\Omega(u)$, surface shape $\vec{N}$ and index of refraction $n(u,\lambda)$ that optimised the difference between the reflectance image and a reflectance model.

The image may be a single image or a set of images. The image may be monochromatic, trichromatic, multispectral or hyperspectral and represents a captured scene. For example, three or more monochromatic images of the same scene, each illuminated by different light directions.

The number of spectral bands in a multispectral or hyperspectral image may range from 4 to 1000 s. The number of light source directions required is based on the number of spectral bands and the specific reflectance model used. Typically, the lesser number of bands requires the larger number of light directions to be known.

The reflectance image comprises more than one image where each image has a different illumination direction $\vec{L}$ and the same viewing direction $\vec{V}$ and wherein optimising comprises optimising the fit of each reflectance image to the reflectance model. The viewing direction $\vec{V}$, light source direction $\vec{L}$, and surface normal direction $\vec{N}$ need not be coplannar.

The disclosure concerns estimating one or more of photogrammetric parameters $\Omega(u)$, surface shape $\vec{N}$ and index of refraction $n(u,\lambda)$ however in one more embodiments the estimation may be sufficiently accurate to be considered a correct determination.

The reflectance model may be based on a Fresnel term $\Gamma(\cdot)$. The Fresnel term may be based on scene geometry (such as light incidence angle $\theta_i$, illumination direction $\vec{L}$, surface shape $\vec{N}$ or viewing direction $\vec{V}$) and the index of refraction $n(u,\lambda)$. That is, the Fresnel term $\Gamma(\cdot)$ is wavelength dependent.

The reflectance model may be further based on a second term $\Lambda(\cdot)$ that is based on scene geometry and photogrammetric parameters. That is, the second term $\Lambda(\cdot)$ is based on $\Theta(u)$ a set of reflection-angle variables (such as variables describing the incident light $\vec{L}$, viewing direction $\vec{V}$ and local surface normal $\vec{N}$ direction) and photogrammetric parameters $\Omega(u)$. Parameters $\Theta(u)$ that describe reflection-angle variables may be expressed in terms of the surface gradients $p(u)$ and $q(u)$.

The difference between the reflectance image and a reflectance model may be defined by a cost function C.

The cost function C is constrained by a surface integrability constraint that may be based on the surface shape $\vec{N}$, in particular surface gradients $p(u)$ and $q(u)$ are constrained so that their cross partial derivatives are equal.

The cost function C may be constrained by the smoothness on the spectral variation of the refractive index $n(u,\lambda)$. The cost function may be constrained by a spatial smoothness constraint on the set of photogrammetric parameters $\Omega(u)$, which may include the surface microfacet roughness. Each constraint is weighted to control its contribution to the cost function C.

The step of optimising the cost function may comprise iteratively minimising a set of Euler-Lagrange equations representative of the cost function. This minimisation is a gradient descent optimisation approach of the cost function in the parameter space.

The method may further comprise receiving a reflectance model to be used in the optimisation.

The reflectance model may be one of:
Beckmann-Kirchoff model,
Vernold-Harvey model,
Torrance-Sparrow model,
Cook-Torrance model, or
Wolff model.

These reflectance models are not limited to application to images having Lambertian reflectance, and instead the reflectance model of this disclosure can accommodate materials of different types captured within the image.

The method may further comprise receiving a user selection or selecting a reflectance model based on the intended use of the one or more estimated photogrammetric parameters $\Omega(u)$, surface shape N and index of refraction $n(u,\lambda)$.

One or more of photogrammetric parameters $W^u$), surface shape $\vec{N}$ and index of refraction $n(u,\lambda)$ that optimise the cost function may be represented by parameters of the reflectance model.

The method may further comprise receiving values for one or more parameters of the reflectance model for the image.

The parameters may be values based on surface shape $\vec{N}$, the material index of refraction $n(u,\lambda)$ or a set of photogrammetric parameters $\Omega(u)$.

The method may further comprise using one or more of the estimated photogrammetric parameters $\Omega(u)$, surface shape N and index of refraction $n(u,\lambda)$ in processing of the image. The processing of the image includes one or more of:
image editing and surface rendering,
shape estimation,
material recognition or classification, or
hardware calibration.

In a second aspect software is provided, that when installed on a computer causes the computer to perform the method described above.

The optional features of the method described above, are also optional features of the software, in that the software may cause the computer to perform to perform those optional features.

In a third aspect, a computer is provided to estimate one or more of photogrammetric parameters $\Omega(u)$, surface shape N and index of refraction $n(u,\lambda)$ represented in a reflectance image having one or more known illumination directions L and a single known viewing direction $\vec{V}$, comprising a processor:
to optimise a difference between the reflectance image and a reflectance model, the reflectance model being based on surface shape $\vec{N}$, the material index of refraction $n(u,\lambda)$ and a set of photogrammetric parameters $\Omega(u)$.

The processor may further operate to identify one or more of photogrammetric parameters $\Omega(u)$, surface shape $\vec{N}$ and index of refraction $n(u,\lambda)$ that optimised the cost function. The computer may further include storage means and input/output means.

The computer may further comprise output means to provide output of the estimated one or more of photogrammetric parameters $\Omega(u)$, surface shape N and index of refraction $n(u,\lambda)$ that optimise the difference between the reflectance image and the reflectance model. The output may be to a display or provided as input to a post-processing method performed by the processor on the image.

Examples of a computer include a standalone personal computer or simply a processor incorporated into a camera.

The optional features of the method described above, are also optional features of the computer, in that the processor may also be adapted to perform or have those optional features.

BRIEF DESCRIPTION OF THE DRAWINGS

Examples will now be described with reference to the accompanying drawings in which:

FIG. 2 shows the Euler-Lagrange equations for the cost function C;

FIG. 3 shows the line-search update equations for the optimisation with respect to the shape and photogrammetric parameters;

FIG. 4 shows the line-search update equations for the Vernold-Harvey reflectance model;

BEST MODES

This disclosure identifies the constraints under which the generally ill-posed problem of simultaneous recovery of surface shape and its photometric invariants can be rendered tractable. We focus our attention on the constraints for the simultaneous recovery of the object shape and photogrammetric parameters from a single view image. The constraints presented here provide a unified setting and understanding of photometric invariant and shape recovery methods based upon variational techniques. The differential equations presented here govern the relation between shape and reflectance.

We provide a general characterisation for a number of reflectance models based upon Fresnel theory and provide a formulation for the optimisation method proposed by way of a cost function.

Photometric Invariants and Shape Recovery

We provide a unifying formulation that applies to a family of reflectance models based on the Fresnel reflection theory. This family comprises models which depend on three sets of variables related to the the scene (i.e. reflection) geometry $\vec{N}$, $\vec{L}$, $\vec{V}$, the material's index of refraction n and other photogrammetric parameters $\Omega(u)$ such as the surface's micro-structure.

More specifically, these reflectance models are those which involve, in general, a wavelength dependent Fresnel term that accounts for the reflection, transmission and refraction of light through the boundary between different object media. This term, in turn, depends on the incident angle $\theta_i$ and index of refraction n.

As a result of the wavelength dependence of the Fresnel term, we cast the problem in a general setting so as to recover the photometric invariants of materials and surface shape from multispectral imagery. It is worth stressing that, the theory here is equally applicable to monochromatic or trichromatic imagery by fixing the discrete wavelength-indexed terms accordingly. Moreover, we also state the constraints upon which the problem is well-defined in terms of the number of illumination directions $\vec{L}$ needed to fit the reflectance model and recover the shape of the object under study.

In the reflectance models herein, the reflection geometry is defined with respect to a local coordinate system whose origin is the surface location and whose z-axis is aligned to the normalised local surface normal $\vec{N}$. The incident light direction $\vec{L}$ is defined by the zenith and azimuth angles $\theta_i$ and $\phi_i$ respectively. Accordingly, the zenith and azimuth angles of the viewer's direction $\vec{V}$ are $\theta_s$ and $\phi_s$.

Figure 1:
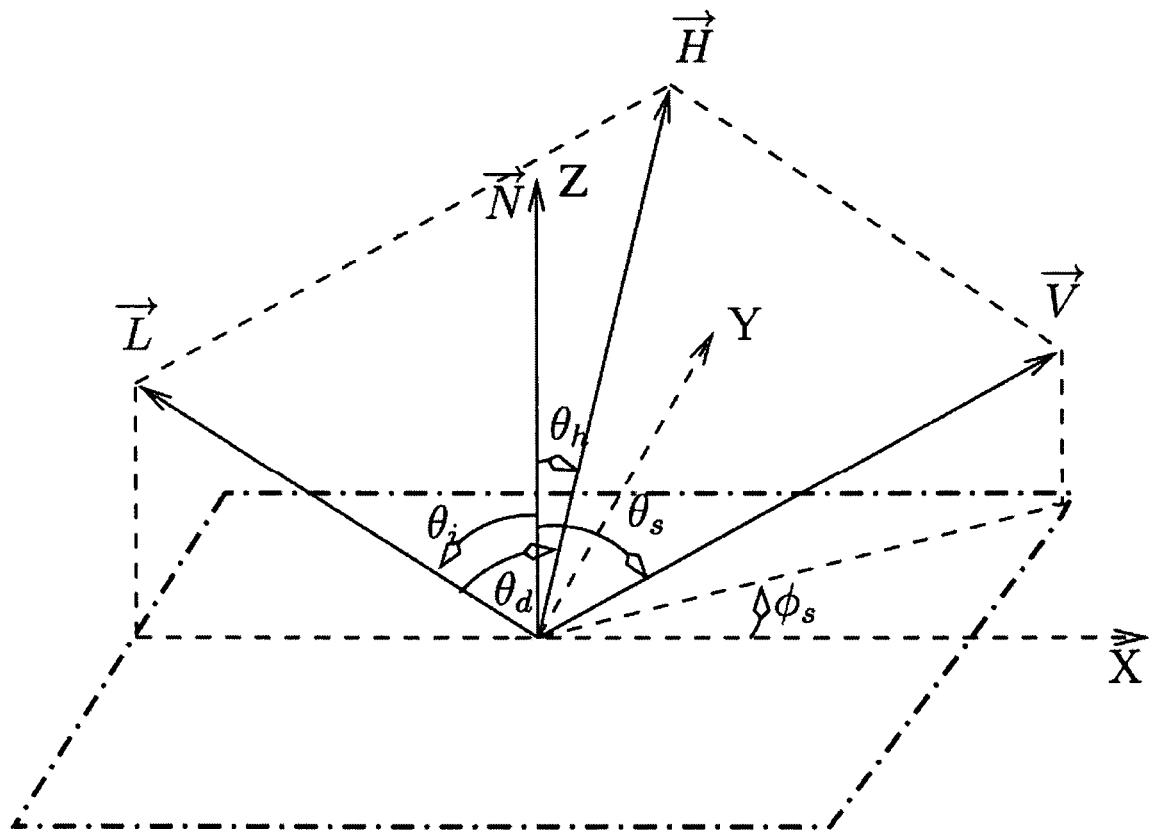
FIG. 1 graphically shows the reflection geometry used in the reflectance models here.

For the sake of simplicity, we assume that the incident light is always in the xz-plane, i.e. $\phi_i = \pi$. Alternatively, reflectance models can be parameterised with another set of angles making use of or with respect to the half-way vector $\vec{H} = \vec{L} + \vec{V}$ which is the sum of the unit-length vectors in the light $\vec{L}$ and viewing directions $\vec{V}$. Note that the reflection geometry can be equivalently represented by the angular difference $\theta_d$ between $\vec{L}$ and $\vec{H}$, the half angle $\theta_h$ between $\vec{N}$ and $\vec{H}$ and the incident angle $\theta_i$. This geometry is illustrated in FIG. 1.

General Reflectance Model

As described above, the reflectance equation at a surface location u and wavelength λ can be, in general, written as a product of two functions $\Gamma(\cdot)$ and $\Lambda(\cdot)$ as follows $$f(u,\lambda) = \Gamma(\Theta(u), n(u,\lambda)) \Lambda(\Theta(u), \Omega(u)) \quad (1)$$

where $\Theta(u)$ is scene geometry variables, that is the set of reflection-angle variables describing the incident light $\vec{L}$, viewing $\vec{V}$ and local surface normal directions $\vec{N}$. $n(u,\lambda)$ is the wavelength-dependent index of refraction of the surface material under monochromatic light. $\Omega(u)$ is the set of photogrammetric parameters, such as the local microfacet slope and its distribution, as well as the masking and shadowing factors. In the model above, $\Theta(u)$ and $\Omega(u)$ are wavelength independent.

In the general formulation above, the function $\Gamma(\cdot)$ in Equation 1 involves a Fresnel term, which is directly related to the incident angle $\theta_i$ and the index of refraction $n(u,\lambda)$. The function $\Lambda(\cdot)$ depends solely on the light source $\vec{L}$ and viewer direction $\vec{V}$, the surface orientation $\vec{N}$ and the photogrammetric parameters $\Omega(u)$. Further below we present a number of reflectance models that comply with the general formulation above by showing their correspondences to the general reflectance equation 1. For now, we focus on the constraints governing the optimisation of the cost function C (see equation (2) below) corresponding to the reflectance equation above.

Constraints for Shape and Reflectance Parameter Recovery

Recall that, at input, we have a set of M multispectral images $\Re_1, \Re_2, \ldots, \Re_M$, where each of the images $\Re_l$ are taken under a different illuminant direction L with known power spectrum. In addition, all the images are observed from the same view point $\vec{V}$. Each of these images is indexed to the wavelength $\lambda \in \{\lambda_1, \ldots, \lambda_K\}$, where $R_l(u,\lambda)$ is the measured spectral reflectance at the pixel-site u on the $l^{th}$ image after being normalised by the respective illumination power spectrum.

From the reflectance images, we aim to recover the model parameters satisfying Equation 1.

To solve this problem, we commence by noting that the reflection angles depend on the illumination direction $\vec{L}$, the viewing direction $\vec{V}$ and the surface orientation $\vec{N}$. While the surface normal $\vec{N}$ and viewing direction $\vec{V}$ are fixed for all the input images, the angles $\Theta_l(u)$ at every pixel site u in the $l^{th}$ image vary with respect to the illumination direction $\vec{L}$. On the other hand, the parameters $n(u,\lambda)$ and $\Omega(u)$ are invariant to the illumination direction $\vec{L}$ and viewing direction $\vec{V}$.

Let us consider a global coordinate system where the origin is located at the view point, the positive z-axis is in the opposite direction to the line of sight and the positive x-axis points towards the right-hand side of the field of view. In this coordinate system, the function z(x,y) is, in effect, the height map at the surface location (x,y) that corresponds to the pixel location u. The surface normal at (x,y) is, by definition, $\vec{N} = [-p(u), -q(u), 1]^T$, where p(u) and q(u) are the surface gradients, i.e.

$$p(u) = \frac{\partial z(x,y)}{\partial x} = z_x$$

and $$q(u) = \frac{\partial z(x,y)}{\partial y} = z_y.$$

Therefore, with known illuminant directions $\vec{L}$, we can reparameterise the general reflectance equation 1 with respect to the surface gradients p(u), q(u) and index it with respect to the image number l as follows $$f_l(u,\lambda)=\Phi_l(p(u),q(u),n(u,\lambda))\Psi_l(p(u),q(u),\Omega(u))$$

This representation offers the advantage of replacing the reflection angle-variables with the surface gradients p(u), p(u). These are invariant with respect to the illuminant direction. More importantly, this formulation implies that the number of geometric variables is two per pixel-site u, which, in turn constraints the number of image reflectance equations needed to recover the surface shape. With the new parameterisation, the image reflectance equations are rewritten as $$f_l(u,\lambda)=R_l(u,\lambda), \forall l=1,\ldots,M$$

Assuming that the number of image pixels in the image is N, the system above consists of M×N×K equations with (|Ω|+K+2)×N independent variables. These include K-wavelength dependent refractive indexes at each pixel and the number of micro-surface scattering variables |Ω|. Without further constraints, this system is only well-defined if and only if the number of equations is at least the same as the number of variables. In other words, the problem is only solvable with at least M≥(|Ω|+K°2)/K images. For all reflectance models described further below, this number is lower-bounded at 2. In summary, this is the theoretical lower bound on the number of illuminants needed in order to recover the surface shapes N and the photometric invariants n(u,λ) and Ω(u) when the illuminant directions L are known.

Note that this lower bound is consistent with the literature of photometric stereo methods for grayscale images with Lambertian models, where K=1 and |Ω|=0.

Optimisation Approach

When only a single image is at hand, the shape and photometric invariant recovery becomes ill-posed. In this case, we resort to constraints based on implicit assumptions on the spectral and local surface variations. Specifically, when the surface under study is smooth, we can enforce the surface integrability constraint, which has been utilised in the field of Shape-From-Shading by several authors [2, 3]. This constraint states that the cross-partial derivatives of p(u) and q(u) should be equal, i.e. $p_y(u)=q_x(u)$ or $$\frac{\partial p}{\partial y} - \frac{\partial q}{\partial x} = 0.$$

furthermore, one can assume smoothness on the spectral variation of the refractive index n (u,λ). This assumption implies that the surface scattering characteristics should vary smoothly across the spatial domain. As we will show below, these assumptions permit the recovery of the shape and photometric invariants n(u,λ) and Ω(u) making use of a line-search approach.

To take our analysis further, we commence by noting that the parameters satisfying the reflectance equations minimise the following cost function $$C = \sum_{l=1}^{M} \int_I \int_W (R_l(u,\lambda) - f_l(u,\lambda))^2 du d\lambda + \alpha \int_I \left(\frac{\partial p(u)}{\partial y} - \frac{\partial q(u)}{\partial x}\right)^2 du + \beta \int_I \int_W \left(\frac{\partial n(u,\lambda)}{\partial \lambda}\right)^2 du d\lambda + \gamma \int_I \left[\left(\frac{\partial \Omega(u)}{\partial x}\right)^2 + \left(\frac{\partial \Omega(u)}{\partial y}\right)^2\right] du \quad (2)$$

where I is the image spatial domain and W is the wavelength range.

The arguments of the cost function C are the surface gradients p(u) and q(u), the index of refraction n (u,λ) and the photogrammetric parameter-set Ω(u). The weights α, β and γ control the contribution to the cost function of the integrability constraint, the spectral smoothness constraint on the refractive index and spatial smoothness constraint on the surface scattering variables, respectively.

With the cost function C at hand, we derive an iterative scheme based upon the Euler-Lagrange equations so as to optimise, in this example minimise, the functional C above. The resulting Euler-Lagrange equations with respect to the argument functions are shown in FIG. 2. In the equations, the x, y subscripts imply partial derivatives with respect to the corresponding axis-variable.

Moreover, we can employ the discrete approximation of the higher order derivatives in the equations shown in FIG. 2. To this end, let the spatial domain be discretised into a lattice with a spacing of $\in_s$ between adjacent pixel-sites and the wavelength domain in steps of $\in_w$. We index p(u), q(u) and Ω(u) according to the pixel coordinates (i,j) and n(u,λ) according to the wavelength index k. With these ingredients, the partial derivatives can be approximated using finite differences. By substituting the finite-differences into the Euler-Lagrange equations, we obtain a set of update equations for the model parameters with respect to the iteration number t.

In FIG. 3, we show the set of resulting update equations, where the superscripts denoting the iteration number. The shorthands are defined as follows, in which $\hat{p}(u)$ and $\hat{q}(u)$ are the cross-derivatives of p(u) and q(u) approximated by finite differences (times $\in_s^2$).

$$\bar{p}(u)|_{u=(i,j)} \square (p_{i,j-1} + p_{i,j+1})/2,$$

$$\bar{q}(u)|_{u=(i,j)} \square (q_{i-1,j} + q_{i+1,j})/2,$$

$$\hat{p}(u)|_{u=(i,j)} \square (p_{i+1,j+1} + p_{i-1,j-1} - p_{i-1,j+1} - p_{i+1,j-1})/4$$

$$\hat{q}(u)|_{u=(i,j)} \square (q_{i+1,j+1} + q_{i-1,j-1} - q_{i-1,j+1} - q_{i+1,j-1})/4$$

$$\bar{n}(\lambda_k) \square (n(\lambda_{k-1}) + n(\lambda_{k+1}))/2$$

$$\bar{\Omega}(u)|_{u=(i,j)} \square (\Omega_{i,j-1} + \Omega_{i,j+1} + \Omega_{i-1,j} + \Omega_{i+1,j})/4$$

Note that the second right-hand terms of the update equations correspond the negative partial derivatives of the data closeness term with respect to each model parameter. These formulae are in fact instances of line-search optimisation where the search from the current iterate is performed in the steepest gradient descent direction. Here, it is revealed that the Euler-Lagrange equation in the function space is equivalent to gradient descent optimisation in the parameter space.

To enforce numerical stability on the update of parameter values over iterations, we introduce a step length along the steepest descent direction. To this end, we employ the Wolfe condition [6] to ensure that the step length delivers a sufficient decrease in the target function. For each update of the model parameters, we perform a backtracking line search approach by starting with an initial long step length and contracting it upon insufficient decrease of the target function.

Reflectance Models Based Upon Fresnel Theory

We examine here in more detail a number of reflectance models for which the general formulation applies.

Note that, so far, we have formulated the constraints in the previous sections in such a manner that the reflectance model under consideration is general in nature. In this section, we show how the general reflectance model presented in Equation 1 captures a family of existing reflectance models in the literature. We do this by establishing a correspondence between the generic parameter sets in the general model and those specific to some of the models used by the computer vision and graphics communities. This is important since it provides a proof of concept that the process of model parameter recovery presented above can be performed on each of these reflectance models at hand. It also provides an explicit link between the equations above and the reflectance models in the literature.

The Fresnel theory has been used extensively in the optics, computer vision and graphics literature to derive reflectance models. Among the physics-based models, the Beckmann-Kirchoff model [1] originated from Kirchoff's theory on the scattering of electromagnetic waves. Torrance and Sparrow [8] employed the Fresnel reflection coefficient to model specular reflection. Wolff [10] derived a diffuse reflectance model for layered dielectrics by analysing the reflection, transmission and refraction of light at the surface boundary.

The models above all have parameters corresponding to surface scattering, reflection geometry and Fresnel reflection coefficients. The parameter equivalence between the general model presented earlier and the following specific models is summarised in Table 1.

$v_z = -k(\cos\theta_i + \cos\theta_s)$, $v_{xy}^2 = v_x^2 + v_y^2$, $g = \sigma^2 v_z^2$. Here, k is the propagation rate of the incident light, related to its wavelength $\lambda$, through the equation $$k = \frac{2\pi}{\lambda}.$$

In Equation 3, $\sigma$ is the standard deviation of the height variation with respect to the mean surface level and the surface correlation length T gives the relative horizontal spacing between the micro-surface extrema. Note that, the surface slope parameter $$\frac{\sigma}{T}$$

TABLE 1

| General model | $\theta$ | $\Omega$ | $\Gamma(\theta, n)$ | $\Lambda(\theta, \Omega)$ |
|---|---|---|---|---|
| Beckmann-Kirchoff | $\theta_i, \theta_h$ | m | $\lambda^2 F(\theta_i, n(\lambda))$ | $\frac{m}{\cos^2\theta_i \cos^4\theta_h} e^{-\frac{m}{4}\tan^2\theta_h}$ |
| Vernold-Harvey | $\theta_i, \theta_d, \theta_h$ | m | $\lambda^2 F(\theta_i, n(\lambda))$ | $\frac{m \cos\theta_i}{\cos^2\theta_d \cos^2\theta_h} e^{-\frac{m}{4}\tan^2\theta_h}$ |
| Torrance-Sparrow | $\theta_i, \theta_s, \phi_s$ | $A_f, \theta, \pi\theta, \sigma\theta$ | $F(\theta_i, n(\lambda))$ | $\frac{A_f}{4} \frac{G_{TS}(\theta_{ip}, \theta_{sp})}{\cos\theta_g} P(\theta)$ |
| Wolff | $\theta_i, \theta_s$ | $\rho_w$ | $[1 - F(\theta_i, n(\lambda))] \times [1 - F(\theta_s', 1/n(\lambda))]$ | $\rho_W \cos\theta_i$ |

In the following, we elaborate further on the parameters in Table 1.

Beckmann-Kirchoff Model

This model can be selected when the surface captured in the image is matt with an intermediate or high level of surface roughness.

With the reflection angles as described in FIG. 1, the Beckmann-Kirchoff model [1] predicts the mean scattered power from a surface point u at wavelength $\lambda$ as a summation of two terms. The first of these represents the scattering component in the specular direction. The second term corresponds to the diffuse scattering component.

Here we focus our attention on the diffuse scattering component for very rough surfaces. Under normalised illuminant power, the surface reflectance is the same as the diffused scattered power. By far, the two most popular approximations of the diffuse reflectance are formulated in the cases of Gaussian and exponential surface correlation functions [1]. When the surface is very rough and the correlation function is Gaussian, the diffuse reflectance at a given wavelength $\lambda$ of incident light from a surface patch of area A is approximated by $$f_{BK}(u, \lambda) = F(\theta_i, n(\lambda))\frac{\pi T^2 G_{BK}^2}{A\sigma^2 v_z^2}\exp\left(-\frac{T^2 v_{xy}^2}{4\sigma^2 v_z^2}\right) \quad (3)$$

where, as before, the Fresnel reflection coefficient $F(\theta_i, n(u, \lambda))$ is wavelength dependent via the index of refraction $n(u, \lambda)$ and we have $v_x = k(\sin\theta_i - \sin\theta_s \cos\phi_s)$, $v_y = -k \sin\theta_s \sin\phi_s$, controls the scattering behaviour for various degrees of roughness. Therefore, it is sufficient to estimate $$\frac{\sigma}{T}$$

from reflectance data rather than each parameter $\sigma$ and T separately. In other words, this is equivalent to estimating the parameter $$m = \left(\frac{T}{\sigma}\right)^2,$$

which is the square inverse of the surface slope.

In Equation 3 the geometric factor $G_{BK}$ explains the attenuation of emitted light by the surface orientation with respect to illuminant and viewing directions. The geometric factor is defined as $$G_{BK}(\theta_i, \theta_s, \phi_s) = \frac{1 + \cos\theta_i\cos\theta_s - \sin\theta_i\sin\theta_s\cos\phi_s}{\cos\theta_i(\cos\theta_i + \cos\theta_s)} \quad (4)$$

To obtain the set of parameters as per Equation 1, we reparameterise the reflection geometry with respect to the incident angle $\theta_i$, the difference angle $\theta_d$ and the half angle $\theta_h$, as follows $$f_{BK}(u, \lambda) = \frac{\lambda^2 F(\theta_i, n(\lambda))m}{16\pi A \cos^2\theta_i \cos^4\theta_h} \exp\left(-\frac{m}{4}\tan^2\theta_h\right) \quad (5)$$

Vernold-Harvey Model

This model can be selected when matt surfaces are captured in the image.

It has been noted that the Beckmann-Kirchoff model commonly breaks down at large incident and scattering angles [7, 9]. This is since the geometric factor $^G BK$ tends to infinity near the grazing angle. Vernold and Harvey [9] have proposed a variant of the Beckmann-Kirchoff model which can cope well with a wide range of angles. In their work, Vernold and Harvey presented a modified geometric factor $G_{VH}^2 = \cos\theta_i$ instead of $G_{BK}^2$.

The modified Beckmann-Kirchoff model proposed by Vernold and Harvey can also be parameterised with respect to the half-vector angles as $$f_{VH}(u, \lambda) = \frac{\lambda^2 F(\theta_i, n(\lambda)) m \cos\theta_i}{16\pi A \cos^2\theta_d \cos^2\theta_h} \exp\left(-\frac{m}{4}\tan^2\theta_h\right) \quad (6)$$

Torrance-Sparrow Model

This model can be selected for surfaces captured in an image comprising perfectly specular microfacet structure.

Torrance and Sparrow's model [8] provides an analytical equation of the reflected radiance from mirror-like microfacets whose slope is randomly distributed. Accoring to the model, the total reflectance from a differential area dA is given by $$f_{TS}(u, \lambda) = w_d \cos\theta_i + \frac{A_f}{4} F(\theta_i, n(\lambda)) \frac{G_{TS}(\theta_{ip}, \theta_{sp})}{\cos\theta_s} P(\vartheta) \quad (7)$$

In Equation 7, the first term is the diffuse reflectance component that obeys Lambert's cosine law and is assigned a weight $w_d$. The latter term is the specular reflectance component. Firstly, $A_f$ is the microfacet's area. In addition, $G_{TS}(\theta_{ip}, \theta_{sp})$ is the geometric attenuation factor which depends on the projections $\theta_{ip}$ and $\theta_{sp}$ of the angular variables $\theta_i$ and $\theta_s$ onto the plane spanned by the facet normal and the mean surface normal $\vec{N}$. Lastly, $\theta$ denotes the angle between the facet normal and the mean surface normal.

For isotropic surfaces, this distribution may assume a Gaussian distribution that is rotationally symmetric about the mean surface normal, $P(\theta) \sim \pi_{74} N(0, \sigma_\theta^2)$, where $N(0, \sigma_\theta^2)$ is a Gaussian distribution with zero mean and a standard deviation $\sigma_\theta$.

Wolff Model

This model can be selected when the surface captured in the image is made of a smooth matt dielectric material.

The model proposed by Wolff [10] is derived from the theory of radiative transfer through layered dielectric surface boundaries. To predict the departure in behaviour from the Lambertian model at large angles between the illuminant and viewing directions, Wolff viewed the energy flux emerging through subsurface as a result of refractive and reflective phenomena inside the dielectric body. This model is hence explained through the use of Snell's law of refraction and the Fresnel attenuation factor. The diffuse subsurface scattering, as defined by the Wolff model, is given by $$f_W(u,\lambda) = \rho_W \cos\theta_i [1 - F(\theta_i, n(\lambda))][1 - F(\theta_s', 1/n(\lambda))] \quad (8)$$

In Equation 8, $\theta_s'$ is the zenith angle of light incident on dielectric-air surface boundary before it is refracted and re-emerges from the surface. This angle is related to the reflection one through Snell's law making use of the expression $\theta_s' = \arcsin(\sin(\theta_s)/n(\lambda))$. In the equation above, $\rho_W$ is the total diffuse albedo after multiple diffuse subsurface scattering.

EXAMPLE 1

In this example, we have an image of an apple on a table and we want to automatically distinguish the apple from the rest of the image based on the recovered parameters of the reflectance model for each pixel in the image.

Figure 7:
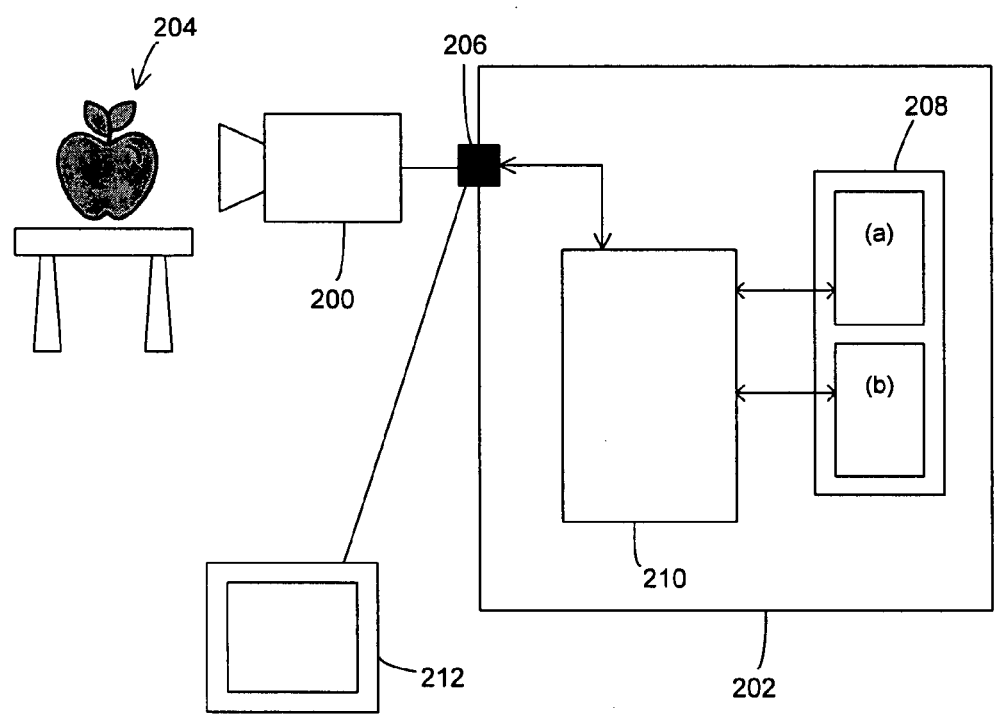
FIG. 7 is an example computer able to implement the methods described.

A computer system shown on FIG. 7 will perform this analysis. This computer system comprises a sensor 200 and a computer 202. In this example the sensor 200 is a hyperspectral camera that is able to capture an image of a scene 204, in this case the apple sitting on a table. The camera may have a number of bands that balances computational costs with accuracy. The camera may have as low as four bands and as high as hundreds. The scene is captured from a known fixed viewing direction V and from one or more illumination directions L. The received image is stored in local memory 208(b) by the processor 210. The image may be stored and used in this method in the compact representation form as described in WO 2009/152583.

Figure 8:
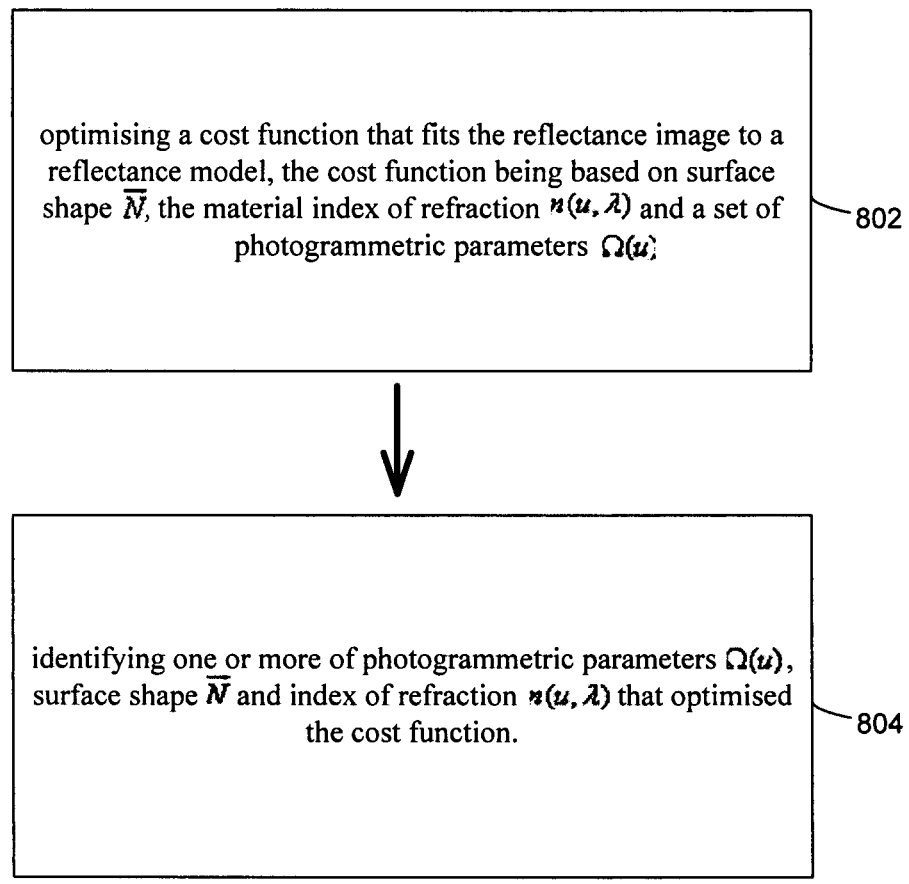
FIG. 8 is a flowchart of the method of example 1.

The processor 210 uses the software stored in memory 208(a) to perform the method shown in FIG. 8. In this sense the processor performs the method of a solver to estimate parameters of a selected reflectance model for the image.

The software provides a user interface that can be presented to the user on a monitor 212. The user interface is able to accept input from the user (i.e. touch screen), such as the image, reflectance model selection, any known values of parameters of the selected reflectance model for the image, viewing $\vec{V}$ and illumination directions $\vec{L}$.

The user input is provided to the input/out port 206 by the monitor 212. The selected image is stored in memory 208(b) by the processor 210. In this example the memory 208(b) is local to the computer 202, but alternatively could be remote to the computer 202.

In this example the user selection of the reflectance model is the Beckmann-Kirchoff model as shown in equation (5). That means that the user is attempting to recover the parameters surface gradients p(u) and q(u), index of refraction n(u, $\lambda$) and roughness m(u). In alternate embodiments the computer is programmed to automatically select the most appropriate model based on an analysis of the image, such as degree of specularity etc.

The user also enters into the user interface the viewing direction $\vec{V}$ and the illumination direction $\vec{L}$ for each image. Since the values of the parameters of the reflectance model are not known, no parameter values are entered.

The user also enters the material that they wish to identify, in this case it is apple.

Using this input, the processor 210 executes the software 208(a) to optimise the cost function of equation (3) that fits the reflectance image(s) to a reflectance model 802. As can be seen from equation (3), the cost function used to fit the Beckmann-Kirchoff model is based on surface normal $\vec{N}$, the material index of refraction n(u,$\lambda$) and a set of photogrammetric parameters $\Omega(u)$.

Initially, the independent parameters of the model p, q, m and n are initialized. To perform the first iteration the processor must also derive values of the reflectance f and its partial derivatives $f_p$, $f_q$, $f_m$ and $f_n$ since they are required by equation (5). Since f and its partial derivatives $f_p$, $f_q$, $f_m$ and $f_n$ are dependent on p, q, m and n for this model, this can be computed by the processor before each new iteration as required based on the current values of p, q, m and n.

Alternatively, possible combinations of parameter values are stored in memory 208(*b*) for each reflectance model that can be chosen. In this example in this example f, $f_p$, $f_q$, $f_m$ and $f_n$ are precomputed based on the Beckmann-Kirchoff model and stored in memory 208(*b*). Table 4 shows sample values of this table being the logarithm of the reflectance f and its partial derivatives $f_p$, $f_q$, $f_m$ and $f_n$ for several configurations of the parameters p, q, m and n. These values are precomputed for the light source direction $L=[0,1,1]^T$, and viewing direction $V=[0,1,1]^T$.

TABLE 4

| p | q | m | n | f | $f_p$ | $f_q$ | $f_m$ | $f_n$ |
|---|---|---|---|---|---|---|---|---|
| 0.3 | 0.5 | 0.2 | 1.4 | 0.809646 | 1.6409 | 11.8521 | 4.62571 | 1.33711 |
| 0.3 | 0.5 | 0.2 | 1.8 | 1.11205 | 1.53917 | 10.7739 | 4.62571 | 0.441526 |
| 0.5 | 0.4 | 0.4 | 1.4 | 0.761349 | 2.5903 | 10.1213 | 2.15671 | 1.62541 |
| 0.5 | 0.4 | 0.4 | 1.8 | 1.14419 | 2.38643 | 8.99998 | 2.15671 | 0.590832 |
| 0.2 | 0.4 | 0.8 | 1.4 | 0.75656 | 1.17841 | 10.4055 | 0.99507 | 1.79883 |
| 0.2 | 0.4 | 0.8 | 1.8 | 1.18855 | 1.0709 | 9.11538 | 0.99507 | 0.682292 |
| 0.5 | 0.1 | 1.6 | 1.4 | −0.583543 | 2.69019 | 6.22723 | 0.473372 | 2.8911 |
| 0.5 | 0.1 | 1.6 | 1.8 | 0.156814 | 2.31941 | 5.11489 | 0.473372 | 1.23589 |
| 0.4 | 0.5 | 3.2 | 1.4 | 2.54757 | 0.948273 | 8.17233 | −0.0943996 | 1.29575 |
| 0.4 | 0.5 | 3.2 | 1.8 | 2.83863 | 0.824312 | 7.14345 | −0.0943996 | 0.420628 |

Using equation (5) to generate these values, with some additional formulae for the reflection angles being $$\cos\theta_i = <\vec{N}, \vec{L}22 = -pL_x - qL_y + L_z$$

$$\cos\theta_k = <\vec{N}, \vec{H}> = -pH_x - qH_y + H_z \quad (9)$$

where $\vec{L} = [L_x, L_y, L_z]^T$ and $\vec{H} = [H_x, H_y, H_z]^T$ are known.

Accordingly the processor accesses the table that is specific to the Beckmann-Kirchoff model and estimate the values of f, $f_p$, $f_q$, $f_m$ and $f_n$ based on the initialized values of P, q, m and n Using these values of p, q, m, n, f, $f_p$, $f_m$ and $f_n$ a first iteration of the equations shown in FIG. 3 is computed. As you can see the reflectance value $f_l^{(t)}(u,\lambda(k))$ of the selected model at the current values of the parameters p, q, m, n are accessed by the processor 210 based on a table akin to Table 4 stored in memory 208(*b*).

These line-search equations are iteratively performed, and at the end of each iteration one or more of the parameters are updated for use in the next iteration. Line-search is a numerical optimisation method which searches the parameter space in the negative gradient direction for the optimal values of the parameters. The cost to be optimised here is the whole cost functional C in equation 2.

This is repeated until the cost functional C decreases by an amount below a threshold, or the model parameters are changed by only an amount below a preset threshold and the optimising is complete. Next the photogrammetric parameters $\Omega(u)$, surface shape $\vec{N}$ and index of refraction $n(u,\lambda)$ that optimise the cost function are identified 804. That is the values given by the last iteration are identified as the best estimate of $\Omega(u)$, surface shape $\vec{N}$ and index of refraction $n(u,\lambda)$ using the solver. For the Beckman-Kirchoff model the following correspondences exist between the parameters of the general model in equation 1 and those of the Beckmann-Kirchoff model resulting from the last iteration that optimises the cost function:

| Parameters of the general reflectance model | Corresponding parameters of the Beckmann-Kirchoff model |
|---|---|
| $\Omega(u)$, | m |
| $\vec{N}$ | p, q |
| $n(u, \lambda)$ | n |

The identified values of p, q, m and n are then saved in memory 208(*b*) and also displayed on the user interface.

Next the refractive index n and roughness m are used to classify each pixel as belonging to the apple or not. The range of a priori values for n and m are stored in memory 208(*a*) for a range of materials, including apples. The processor matches the user input of the apple to the appropriate entry in the table to extract the appropriate range of values for that entry.

The processor 210 operates to compare the values n and m of each pixel with the range, and if the pixel falls within the range it marks the pixel with a flag.

The processor 210 also causes the image to be presented on the user interface with all pixels flagged by the processor as having the characteristics of an apple's material identified, such as by a shading of those pixels in a particular colour.

In an alternative example some of the parameters p, q, m and n may be known. The corresponding equation of known parameters of FIG. 4 is simply not performed and in turn the parameter space that can be explored by the line search is reduced. The known value of p, q, m and/or n is provided as user input at the start of the process with the other values such as $\vec{V}$ and $\vec{Z}$.

In an alternative, the user interface/monitor 212 and processor 202 may be incorporated within the camera 200 so that processing of the image occurs locally on the camera.

EXAMPLE 2

In this example the user wants to take images of the apple and change the surface material of the apple so that it resembles another material, such as marble.

The same procedure as above is performed to obtain the values p, q, m and n.

The user also enters in the user interface the material they wish to change the apple surface to. In this case marble is entered from a list of materials. The processor 210 looks in the materials table stored in memory 208(*b*) to recover the values for m and n for marble.

The values for m and n for marble is then provided as input into the equation (5) and using the other estimated parameter values for the image, a reflectance value of each pixel flagged as being an apple is estimated using equation (5). These new reflectance values are then compiled as a new image, stored in memory 208(*b*) and displayed to the user on the user interface.

Alternatively, the computer 202 may be connected to a further computer system, either local or remote, that receives a copy of the image. Further alternatively, the computer 202 may simply operate to display the user interface on the monitor and receive the user input which is then passed to a remote computer system that performs the method described above and returns the image to the computer 202 via port 206 for display on the user interface.

EXAMPLE 3

In examples 3 and 4 we fit the Vernold Harvey model to multispectral images. It is analytically more tractable to deal with the Vernold-Harvey model in its log form, i.e. we deal with the log version of the original Vernold-Harvey equation.

$$h_{VH}(u, \lambda) = \log\left(\frac{\lambda^2}{16\pi A}\right) + \log F(\theta_i, n(\lambda)) +$$
$$\log n + \log(\cos\theta_i) - 2\log(\cos\theta_d) - 2\log(\cos\theta_h) - \frac{m}{4}\tan^2\theta_h$$

The log reflectance equation above yields the update equations in FIG. 4 when being substituted into the general form in FIG. 3.

In example 3 we present results on shape recovery from images of synthetically generated surfaces. To obtain the synthetic data, we render images of synthetic shapes using the spectra of refractive index of real-world materials reported in [4]. The images were synthesised using the Vernold-Harvey model with various values of the surface roughness m between 2.5 and 4. Furthermore, we compare our recovered surface normals with those obtained by Worthington and Hancock's method [11]. This is a regularization method which takes grayscale Lambertian images at input and delivers surface normals at output.

Table 2 reports the overall accuracy of the needle maps recovered by our method and that of Worthington and Hancock (W&H), across all the materials and surface roughness under study.

TABLE 2

| | Shape error | | | Refractive index error | |
|---|---|---|---|---|---|
| | One illuminant | Two iluminants | W&H | One illuminant | Two iluminants |
| Ridge | 12.0 ± 12.3 | 12.8 ± 13.9 | 11.9 ± 9.4 | 0.0990 ± 0.0555 | 0.0990 ± 0.0555 |
| Volcano | 18.0 ± 12.44 | 18.0 ± 12.4 | 18.17 ± 14.6 | 0.0990 ± 0.0555 | 0.0990 ± 0.0555 |

The error is expressed as the deviation angle per-pixel from the ground-truth needle map, in degrees. Here, our algorithm is comparable to the alternative method in recovering the shape of the Ridge and the Volcano. Note that our algorithm is performed on multispectral images synthesised using Vernold Harvey model, which is more complex than the Lambertian images input to Worthington and Hancock's algorithm. Also note that the needle map accuracy is consistent in both the single illuminant and two illuminant cases. This demonstrates the robustness of the algorithm in cases where shadows appear under a light source direction, but not the other.

Figure 5:
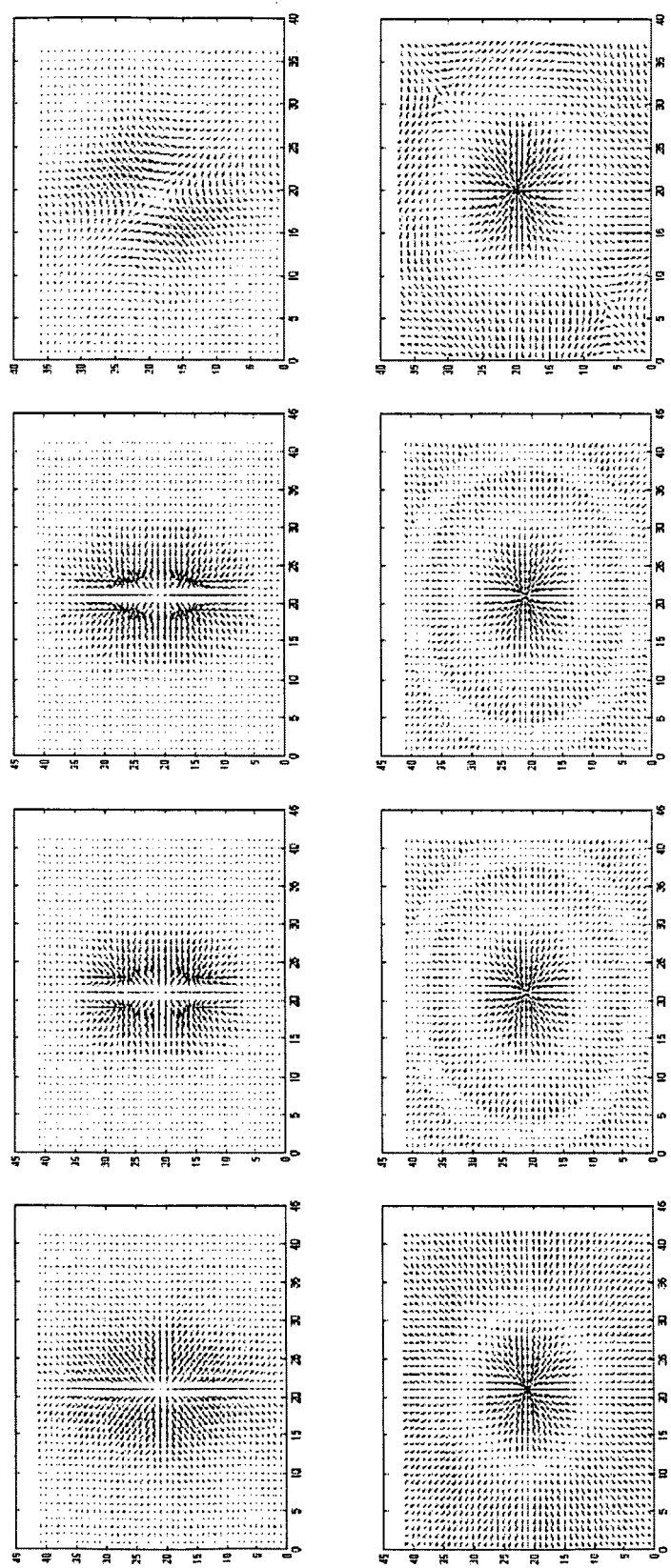
FIG. 5 shows needle maps of a Ridge (top) and a Volcano (bottom)

FIG. 5 illustrates the needle maps recovered from the synthetic images. Here, we present the results in the single and two illuminant cases. The first columns of maps shows the ground truth. Second column shows those recovered by our method using a single illuminant. Third column shows those recovered by our method using two illuminants. Fourth column shows those recovered by Worthington and Hancock.

Qualitatively, our algorithm is able to recover a similar curvature to the ground truth. In addition, surface smoothness as well as surface extrema and discontinuities are also visible in our needle map. Meanwhile, Worthington and Hancock's algorithm seems to distort the overall shape of the Ridge and creates undesirable curvature near the boundary of the Volcano image.

EXAMPLE 4

In this example, we first report the error on the refractive indices recovered from the synthetic images mentioned earlier. Columns 5-6 of Table 2 show the mean and standard deviation of the error on the value of the estimated refractive indices, as compared to their ground truth. These figures imply that the relative error of this estimation is in the order of less than 7% for all the materials under study, which have refractive indices above 1. This result suggests that our algorithm is a potential passive method for refractive index acquisition.

Next, we verify the accuracy of the recovered model parameters through skin segmentation on real-world multispectral images. To achieve this, we recover the refractive index of materials using the method described from multispectral images and utilise it as a descriptor for recognition purposes. In addition, we also compare the results of performing our recovery algorithm on single images and pairs of images of the same scene taken under two different light directions. The degree of similarity in the performance in both cases show that the additional constraint imposed in the single-image case is valid. This experiment is performed on an image database of 50 human subjects, each captured under one of 10 light sources with varying directions and spectral power.

We focus our attention to the photometric invariance of the index of refraction recovered by our algorithm and its applications to recognition tasks. Specifically, we treat the index of refraction as a feature vector for skin segmentation. The segmentation task is viewed as a classification problem where the skin and non skin spectra comprise positive and negative classes. Here we also compare the segmentation accuracy when using the index of refraction with the raw reflectance spectra which has been normalised by the illuminant power.

To obtain the training examples, we select skin and non-skin rectangular regions, of sizes 25×17 and 24×16 respectively, from 10% of the images in the database, from which the index of refraction and raw reflectance are extracted and used as training features. Subsequently, we train a Support Vector Machine (SVM) classifier with a second order polynomial kernel on the training set. The resulting SVM model is applied for classifying skin versus non skin pixels in the remaining images of the subjects.

Figure 6:
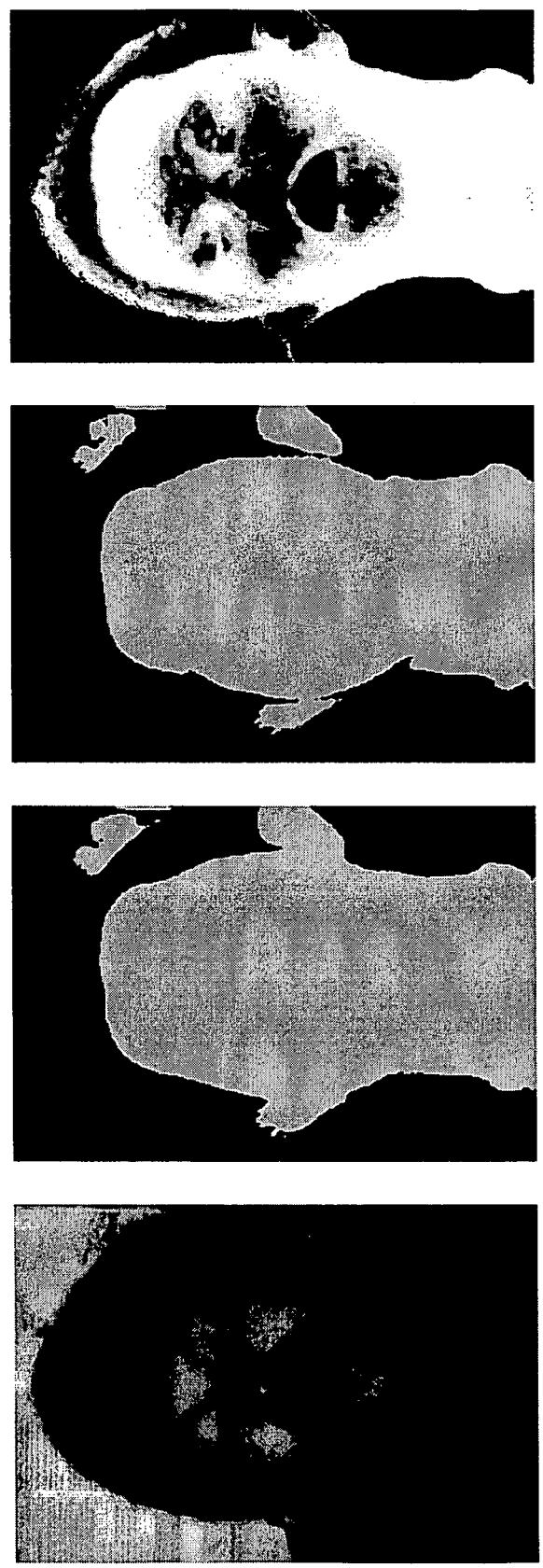
FIG. 6 shows a skin segmentation maps of a human face using the index of refraction recovered from single image (left-most column), two images (middle column) and the raw spectral data (right-most column)

In FIG. 6 we show the original image of a human face captured at the wavelength of 670 nm in the first column. The skin segmentation maps making use of the index refraction recovered under one and two light source directions are shown in the middle columns. The right most column shows the skin map recovered using the raw reflectance. The brightness of the pixel corresponds to the likelihood of being skin. Note that the former two segmentation maps are similar for the subjects. This confirms the effectiveness of our regularizers in enforcing additional constraints in the case of single light direction. These constraints, as can be seen, achieve a performance close to that for two light source directions. On the other hand, the raw reflectance spectra result in more false positives and negatives than the index of refraction, which proves that the refractive index is a better photometric invariant for recognition purposes.

To support our qualitative results, in Table 3, we quantify the skin segmentation performance with the recovered index of refraction and raw spectral reflectance as descriptors in terms of the classification rate (CR), the correct detection rate (CDR) and false detection rate (FDR).

| General model | $\theta$ | $\Omega$ | $\Gamma(\theta, n)$ | $\Lambda(\theta, \Omega)$ |
|---|---|---|---|---|
| Beckmann-Kirchoff | $\theta_i, \theta_h$ | m | $\lambda^2 F(\theta_i, n(\lambda))$ | $\dfrac{m}{\cos^2 \theta_i \cos^4 \theta_h} e^{-\frac{m}{4}\tan^2 \theta_h}$ |
| Vernold-Harvey | $\theta_i, \theta_d, \theta_h$ | m | $\lambda^2 F(\theta_i, n(\lambda))$ | $\dfrac{m \cos \theta_i}{\cos^2 \theta_d \cos^2 \theta_h} e^{-\frac{m}{4}\tan^2 \theta_h}$ |
| Torrance-Sparrow | $\theta_i, \theta_s, \phi_s$ | $A_f, \theta, \pi\theta, \sigma\theta$ | $F(\theta_i, n(\lambda))$ | $\dfrac{A_f}{4} \dfrac{G_{TS}(\theta_{ip}, \theta_{sp})}{\cos \theta_g} P(\theta)$ |
| Wolff | $\theta_i, \theta_s$ | $\rho_w$ | $[1 - F(\theta_i, n(\lambda))] \times [1 - F(\theta_s', 1/n(\lambda))]$ | $\rho_w \cos \theta_i$ |

The correct detection rate is the percentage of skin pixels correctly classified. The false detection rate is the percentage of non-skin pixels incorrectly classified. The classification rate is the overall percentage of skin and non-skin pixels correctly classified. To obtain the result, we randomly select 10% of the image database as training data and compute the average performance over 20 random tests. The results are consistent with the skin maps shown in FIG. 6 in the sense that the average segmentation accuracy using the refractive index in the one-illuminant and two-illuminant settings are similar. Furthermore, the overall performance in the two-illuminant setting is more stable due to the additional reflectance equations introduced by the second illuminant direction. On the other hand, the raw reflectance spectra, as before, yields lower performance in both the overall classification rate and correct detection rate. It also suffers from a high number of false positives.

We have provided a principled link between shape recovery and photometric invariance. We have done this by providing the constraints governing the recovery of the reflectance and object shape parameters. The setting presented here applies to a number of reflectance models used by the computer vision and graphics communities and is consistent with results in shape-from-shading, photometric stereo and regularisation theory. We have shown the utility of this general set of optimisation constraints for purposes of material recognition and shape recovery.

Processing

The above examples show that the estimated photogrammetric parameters, surface shape and index of refraction that optimised the cost function can be used in pre and post processing of the one or more images.

Processing of the image includes, but is not limited to:
Image editing and surface rendering
re-illumination, such as colour manipulation to change an image from warm to cold
light source re-positioning
re-shading
re-colouring, for example to change a black and white image to colour based on the properties of a known colour set or applying the reflective properties of one image to another
material modification
Shape estimation
recovery of shape of an object or scene captured in the image
Material recognition or classification
material, pattern or object recognition and classification
Hardware calibration
improve photometric calibration, such as of a camera that captured the image Processing of an image in this way could be included as a function available on a camera 200, or on a separate computer having software installed to process the image 202.

Applications of this disclosure include in the fields of
digital photography, such as image editing
manufacturing, such as quality and production control. For example, surface dent detection on a production line
product analysis, such as determining whether a vehicle had been in an accident by identifying differences on repaired or detailed paint
surveillance, such as face identification and tracking.

Where a hyperspectral camera is used, the application will often have the benefit of reducing the number of cameras needed to produce the same analysis, reducing the set up costs.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data streams along a local network or a publicly accessible network such as the internet.

It should also be understood that, unless specifically stated otherwise as apparent from the following discussion, it is appreciated that throughout the description, discussions utilizing terms such as "processing" or "computing" or "calculating", "optimizing" or "estimating" or "determining" or "displaying" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A computer implemented method of estimating one or more of photogrammetric parameters, surface shape and index of refraction represented in a reflectance image having one or more known illumination directions and a single known viewing direction, the method comprising:
optimizing a cost function defining a difference between the reflectance image and a reflectance model, the reflectance model being based on surface shape, the material index of refraction and a set of photogrammetric parameters, wherein optimizing the cost function comprises updating the surface shape, updating the material index of refraction, and updating the set of photogrammetric parameters.

2. The computer implemented method of claim 1, wherein photogrammetric parameters includes one or more of microscopic roughness factor, local microfacet slope, masking factor, reflectance factor, or shadowing factor.

3. The computer implemented method of claim 1, wherein surface shape is based on surface normals which include surface gradients.

4. The computer implemented method of claim 1, wherein the reflectance image comprises more than one image where each image has a different illumination direction and the same viewing direction and wherein optimizing comprises optimizing the fit of each reflectance image to the reflectance model.

5. The computer implemented method of claim 1, where the reflectance model is based on a Fresnel term.

6. The computer implemented method of claim 5, wherein the reflectance model is further based on a second term that includes a set of reflection-angle variables and photogrammetric variables.

7. The computer implemented method of claim 1, wherein the cost function is constrained by a surface integrability constraint that is based on the surface shape.

8. The computer implemented method of claim 1, wherein the cost function is constrained by the smoothness on the spectral variation of the refractive index.

9. The computer implemented method of claim 1, wherein the cost function is constrained by a spatial smoothness constraint on surface microfacet variables that is based on the set of photogrammetric parameters.

10. The computer implemented method of claim 1, wherein optimizing the cost function comprises iteratively minimizing a set of Euler-Lagrange equations representative of the cost function.

11. The computer implemented method of claim 1, wherein the method further comprises receiving or selecting a reflectance model to be used in the optimization.

12. The computer implemented method of claim 1, wherein the reflectance model is one of:
Beckmann-Kirchoff model,
Vemold-Harvey model,
Torrance-Sparrow model, Cook-Torrance model, or
Wolff model.

13. The computer implemented method of claim 1, wherein the one or more of photogrammetric parameters, surface shape and index of refraction that optimized the difference between the reflectance image and a reflectance model are represented by parameters of the reflectance model.

14. The computer implemented method of claim 1, wherein the method further comprises receiving values for one or more parameters of the reflectance model for the image.

15. The computer implemented method of claim 1, wherein the method further comprises using the one or more of photogrammetric parameters, surface shape and index of refraction that optimized the cost function in processing of the image.

16. The computer implemented method of claim 15, wherein the processing of the image includes one or more of:
image editing and surface rendering, shape estimation,
material recognition or classification, or
hardware calibration.

17. The computer implemented method of claim 1, wherein the method further comprises identifying one or more of photogrammetric parameters, surface shape and index of refraction that optimizes the cost function for use in processing of the image.

18. A non-transitory computer readable medium storing computer executable instructions, that when executed by a computer, cause the computer to perform the method of claim 1.

19. A computer to estimate one or more of photogrammetric parameters, surface shape and index of refraction represented in a reflectance image having one or more known illumination directions and a single known viewing direction, comprising a processor:
to optimize a cost function defining a difference between the reflectance image and a reflectance model, the reflectance model being based on surface shape, the material index of refraction and a set of photogrammetric parameters, wherein optimizing the cost function comprises updating the surface shape, updating the material index of refraction, and updating the set of photogrammetric parameters.

* * * * *

UNITED STATES PATENT AND TRADEMARK OFFICE
CERTIFICATE OF CORRECTION

PATENT NO. : 8,953,906 B2
APPLICATION NO. : 13/394105
DATED : February 10, 2015
INVENTOR(S) : Antonio Robles-Kelly and Cong Phuoc Huynh It is certified that error appears in the above-identified patent and that said Letters Patent is hereby corrected as shown below:

On the Title Page, item (54) and in the Specification, Column 1, line 1,
    The Title of the Patent Should Read As Follows:
        ESTIMATING REFLECTANCE MODEL PARAMETERS FROM AN IMAGE On the Title Page, item (57)
    Within the Abstract, Line 10 Should Read As Follows:
        parameters, $\Omega(u)$ surface shape $\vec{N}$ and index of refraction $n(u, \lambda)$ Within the Abstract, Line 12 Should Read As Follows:
        illumination directions $\vec{L}$ and a known viewing direction $\vec{V}$, the Within the Abstract, Lines 15-16 Should Read As Follows:
        model being based on surface shape $\vec{N}$; the material index of
        refraction $n(u, \lambda)$ and a set of photogrammetric parameters $\Omega(u)$.

In the Specification:
    Column 3, Line 63 Should Read As Follows:
        $\Omega(u)$, surface shape $\vec{N}$ and index of refraction $n(u, \lambda)$.

Column 4, Line 8 Should Read As Follows:
        $\vec{N}$ and index of refraction $n(u, \lambda)$ in processing of the image.

Column 4, Line 22 Should Read As Follows:
        more of photogrammetric parameters $\Omega(u)$, surface shape $\vec{N}$ Signed and Sealed this
Fifteenth Day of December, 2015

Michelle K. Lee
*Director of the United States Patent and Trademark Office*

CERTIFICATE OF CORRECTION (continued)
U.S. Pat. No. 8,953,906 B2

Column 4, Line 24 Should Read As Follows:

image having one or more known illumination directions $\vec{L}$

Column 4, Line 38 Should Read As Follows:

parameters $\Omega(u)$, surface shape $\vec{N}$ and index of refraction

Column 6, Line 31 Should Read As Follows:

taken under a different illuminant direction $\vec{L}$ with known

Column 7, Line 23 Should Read As Follows:

least $M \geq (|\Omega| + K + 2) / K$ images. For all reflectance models

Column 7, Line 26 Should Read As Follows:

illuminants needed in order to recover the surface shapes $\vec{N}$

Column 7, Line 28 Should Read As Follows:

illuminant directions $\vec{L}$ are known.

Column 8, Lines 30-40 Should Read as Follows:

$$\overline{p}(u)|_{u=(i,j)} \triangleq (p_{i,j-1} + p_{i,j+1})/2,$$

$$\overline{q}(u)|_{u=(i,j)} \triangleq (q_{i-1,j} + q_{i+1,j})/2,$$

$$\hat{p}(u)|_{u=(i,j)} \triangleq (p_{i+1,j+1} + p_{i-1,j-1} - p_{i-1,j+1} - p_{i+1,j-1})/4$$

$$\hat{q}(u)|_{u=(i,j)} \triangleq (q_{i+1,j+1} + q_{i-1,j-1} - q_{i-1,j+1} - q_{i+1,j-1})/4$$

$$\overline{n}(\lambda_k) \triangleq (n(\lambda_{k-1}) + n(\lambda_{k+1}))/2$$

$$\overline{\Omega}(u)|_{u=(i,j)} \triangleq (\Omega_{i,j-1} + \Omega_{i,j+1} + \Omega_{i-1,j} + \Omega_{i+1,j})/4$$

Column 9, TABLE 1 Should Read As Follows:

| General model | $\Theta$ | $\Omega$ | $\Gamma(\Theta, n)$ | $\Lambda(\Theta, \Omega)$ |
|---|---|---|---|---|
| Beckmann-Kirchoff | $\theta_i, \theta_h$ | $m$ | $\lambda^2 F(\theta_i, n(\lambda))$ | $\frac{m}{\cos^2\theta_i \cos^4\theta_h} e^{-\frac{m}{4}\tan^2\theta_h}$ |
| Vernold-Harvey | $\theta_i, \theta_d, \theta_h$ | $m$ | $\lambda^2 F(\theta_i, n(\lambda))$ | $\frac{m \cos\theta_i}{\cos^2\theta_d \cos^2\theta_h} e^{-\frac{m}{4}\tan^2\theta_h}$ |
| Torrance-Sparrow | $\theta_i, \theta_s, \phi_s$ | $A_f, \vartheta, \pi_\vartheta, \sigma_\vartheta$ | $F(\theta_i, n(\lambda))$ | $\frac{A_f}{4} \frac{G_{TS}(\theta_{ip}, \theta_{sp})}{\cos\theta_s} P(\vartheta)$ |
| Wolff | $\theta_i, \theta_s$ | $\rho_W$ | $[1 - F(\theta_i, n(\lambda))] \times [1 - F(\theta_s', 1/n(\lambda))]$ | $\rho_W \cos\theta_i$ |

Column 11, Line 11 Should Read As Follows:

9]. This is since the geometric factor $G_{BK}$ tends to infinity

Column 11, Lines 19-34 is a duplicate of Table 1 and should be deleted.

Column 11, Line 50 Should Read As Follows:

mean surface normal, $P(\vartheta) \sim \pi_\vartheta N(0, \sigma_\vartheta^2)$, where $N(0, \sigma_\vartheta^2)$ is a Column 11, Line 52 Should Read As Follows:

tion $\sigma_\vartheta$.

Column 12, Lines 22-23 Should Read As Follows:

Viewing direction $\vec{V}$ and from one or more illumination directions $\vec{L}$. The received image is stored in local memory 208(b)

Column 13, Equation 9 Should Read As Follows:

$$\cos\theta_i = \langle \vec{N}, \vec{L} \rangle = -pL_x - qL_y + L_z$$
$$\cos\theta_k = \langle \vec{N}, \vec{H} \rangle = -pH_x - qH_y + H_z$$